(12) United States Patent
Jun (10) Patent No.: US 12,169,609 B2
(45) Date of Patent: Dec. 17, 2024

(54) TOUCH PANEL, TOUCH METHOD, ELECTRONIC APPARATUS, AND STORAGE MEDIUM

(71) Applicant: Beijing ESWIN Computing Technology Co., Ltd., Beijing (CN)

(72) Inventor: Jae Hun Jun, Beijing (CN)

(73) Assignee: BEIJING ESWIN COMPUTING TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/090,951

(22) Filed: Dec. 29, 2022

(65) Prior Publication Data

US 2023/0244343 A1    Aug. 3, 2023

(30) Foreign Application Priority Data

Jan. 28, 2022  (CN) .......................... 202210107344.7

(51) Int. Cl.
    *G06F 3/041*    (2006.01)
(52) U.S. Cl.
    CPC .. *G06F 3/0418* (2013.01); *G06F 2203/04107* (2013.01)
(58) Field of Classification Search
    CPC .................. G06F 3/0418; G06F 2203/04107
    USPC ................................................ 345/173–174
    See application file for complete search history.

(56) References Cited

U.S. PATENT DOCUMENTS

| 11,327,605 B1 * | 5/2022 | Ito ........................... G06F 3/044 |
| 11,675,459 B1 * | 6/2023 | Kang .................. G06F 3/04166 345/174 |
| 2015/0091864 A1 * | 4/2015 | Reynolds ............ G06F 3/04184 345/174 |

FOREIGN PATENT DOCUMENTS

| CN | 103221905 A | 7/2013 |
| CN | 113220172 A | 8/2021 |

OTHER PUBLICATIONS

Specification of U.S. Appl. No. 63/261,617, filed Sep. 24, 2021 (Year: 2021).*
Drawings of U.S. Appl. No. 63/261,617, filed Sep. 24, 2021 (Year: 2021).*

* cited by examiner

*Primary Examiner* — Kwin Xie
(74) *Attorney, Agent, or Firm* — Scully, Scott, Murphy & Presser, P.C.

(57) ABSTRACT

A touch panel, a touch method, an electronic apparatus, and a non-transitory computer-readable storage medium are provided. The touch panel includes a touch chip and a touch electrode. The touch chip is configured to generate a touch driving signal and apply the touch driving signal to the touch electrode, the touch electrode is configured to receive the touch driving signal and generate a touch sensing signal based on the touch driving signal, and the touch driving signal includes a plurality of sub-signals, the plurality of sub-signals includes a first sub-signal and a second sub-signal, and the first sub-signal is different from the second sub-signal.

13 Claims, 6 Drawing Sheets

TOUCH PANEL, TOUCH METHOD, ELECTRONIC APPARATUS, AND STORAGE MEDIUM

CROSS-REFERENCE TO RELATED APPLICATION

The present application claims priority of Chinese Patent Application No. 202210107344.7 filed on Jan. 28, 2022, and the entire content disclosed by the Chinese patent application is incorporated herein by reference as part of the present application for all purposes.

TECHNICAL FIELD

The embodiments of the present disclosure relate to a touch panel, a touch method, an electronic apparatus, and a non-transitory computer-readable storage medium.

BACKGROUND

Electromagnetic Interference (EMI) is an electronic noise that interferes with a cable signal and reduces signal integrity. Usually, the electromagnetic interference includes conduction interference and radiation interference. Conduction interference indicates that a signal on one electrical network is coupled to (or made interfere with) another electrical network through a conductive medium. Radiation interference indicates that an interference source couples (or interferes) a signal to another electrical network through space. In a high-speed Printed Circuit Board (PCB) and system design, high-frequency signal lines, pins of integrated circuits, various connectors and plug-ins, and the like may become radiation interference sources having antenna characteristics, which are capable of emitting electromagnetic waves and affecting normal operations of other systems or other sub-systems within the system.

SUMMARY

At least one embodiment of the present disclosure provides a touch panel, comprising a touch chip and a touch electrode, the touch chip is configured to generate a touch driving signal and apply the touch driving signal to the touch electrode, the touch electrode is configured to receive the touch driving signal, and generate a touch sensing signal based on the touch driving signal, and the touch driving signal comprises a plurality of sub-signals, the plurality of sub-signals comprise a first sub-signal and a second sub-signal, and the first sub-signal is different from the second sub-signal.

For example, in the touch panel provided in at least one embodiment of the present disclosure, each sub-signal has a plurality of characteristics, for each sub-signal, the plurality of characteristics of the sub-signal comprise a rising edge time period of the sub-signal, a falling edge time period of the sub-signal, and a duration period of the sub-signal; and at least one characteristic of the first sub-signal is different from at least one characteristic of the second sub-signal.

For example, in the touch panel provided in at least one embodiment of the present disclosure, the plurality of sub-signals comprise a plurality of sub-signal groups, and each sub-signal group comprises N sub-signals, N is a positive integer greater than 1; and the N sub-signals comprise the first sub-signal and the second sub-signal.

For example, in the touch panel provided in at least one embodiment of the present disclosure, at least two rising edge time periods in N rising edge time periods respectively corresponding to the N sub-signals are different from each other.

For example, in the touch panel provided in at least one embodiment of the present disclosure, in terms of time, the N sub-signals are generated successively, the N rising edge time periods respectively corresponding to the N sub-signals increase or decrease sequentially according to a generation order of the N sub-signals.

For example, in the touch panel provided in at least one embodiment of the present disclosure, N falling edge time periods respectively corresponding to the N sub-signals are all identical.

For example, in the touch panel provided in at least one embodiment of the present disclosure, at least two falling edge time periods in N falling edge time periods respectively corresponding to the N sub-signals are different from each other.

For example, in the touch panel provided in at least one embodiment of the present disclosure, in terms of time, the N sub-signals are generated successively, and the N falling edge time periods respectively corresponding to the N sub-signals increase or decrease sequentially according to a generation order of the N sub-signals.

For example, in the touch panel provided in at least one embodiment of the present disclosure, N duration periods respectively corresponding to the N sub-signals are all identical.

For example, in the touch panel provided in at least one embodiment of the present disclosure, at least two duration periods in N duration periods respectively corresponding to the N sub-signals are different from each other.

For example, in the touch panel provided in at least one embodiment of the present disclosure, in terms of time, the N sub-signals are generated successively, and the N duration periods respectively corresponding to the N sub-signals increase or decrease sequentially according to a generation order of the N sub-signals.

For example, in the touch panel provided in at least one embodiment of the present disclosure, a difference between duration periods of two sub-signals, generated adjacent in terms of time, among the N sub-signals is a fixed value.

For example, in the touch panel provided in at least one embodiment of the present disclosure, the N sub-signals further comprise a third sub-signal; the first sub-signal is a triangular wave signal, the second sub-signal is a sine wave signal, and the third sub-signal is a trapezoidal wave signal.

For example, the touch panel provided in at least one embodiment of the present disclosure further comprises a guard electrode, the touch chip is configured to apply the touch driving signal to the touch electrode in a touch phase, the touch chip is configured to generate and apply a guard signal to the guard electrode in the touch phase, and the guard signal is identical to the touch driving signal.

For example, the touch panel provided in at least one embodiment of the present disclosure further comprises: a data line, a gate line, a pixel electrode, and a transistor, a gate electrode of the transistor is electrically connected with the gate line, a first electrode of the transistor is electrically connected with the data line, and a second electrode of the transistor is electrically connected with the pixel electrode; the data line and/or the gate line is multiplexed as the guard electrode.

For example, the touch panel provided in at least one embodiment of the present disclosure further comprises: a touch signal line, the touch electrode is connected to the touch chip through the touch signal line, the touch chip applies the touch driving signal to the touch electrode through the touch signal line, and the touch chip receives the touch sensing signal generated by the touch electrode through the touch signal line to implement a touch function.

At least one embodiment of the present disclosure further provides a touch method, which is applied to the touch panel provided in any one of the embodiments of the present disclosure and comprises: in a touch phase: generating the touch driving signal; applying the touch driving signal to the touch electrode; generating, by the touch electrode, the touch sensing signal; and sensing the touch sensing signal to implement a touch function.

For example, in the touch method provided in at least one embodiment of the present disclosure, in the case where the touch panel comprises a guard electrode, and the touch method further comprises: in the touch phase: generating a guard signal, the guard signal being identical to the touch driving signal; and applying the guard signal to the guard electrode.

At least one embodiment of the present disclosure further provides an electronic apparatus comprising the touch panel provided in any one of the embodiments of the present disclosure.

At least one embodiment of the present disclosure further provides a non-transitory computer-readable storage medium configured to store computer executable instructions, and when the computer executable instructions are executed by a computer, the touch method according to any one of the embodiments of the present disclosure is implemented.

BRIEF DESCRIPTION OF THE DRAWINGS

In order to more clearly illustrate the technical solutions of the embodiments of the present disclosure, the accompanying drawings of the embodiments will be briefly described in the following; it is obvious that the described drawings are only related to some embodiments of the present disclosure and thus are not a limitation of the present disclosure.

DETAILED DESCRIPTION

In order to make objects, technical solutions, and advantages of the embodiments of the present disclosure more apparent, the technical solutions of the embodiments of the present disclosure will be described in a clearly and fully understandable way in connection with the drawings related to the embodiments of the present disclosure. Apparently, the described embodiments are just a part but not all of the embodiments of the present disclosure. Based on the described embodiments of the present disclosure herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount, or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In order to keep the following descriptions of the embodiments of the present disclosure clear and concise, the present disclosure omits detailed descriptions of some known functions and known components.

Among characteristics of electronic products, EMI characteristics become more and more important. Especially, EMI caused by a repeated signal or a signal with a great driving voltage is the most difficult problem in the electronic products at present. Methods for reducing EMI may include using an anti EMI tape (using the anti EMI tape to cover a driver IC and a transmission line to prevent EMI radiation) or an anti EMI filter, etc.; however, due to design characteristics of the products, the above-described methods are usually difficult to apply to actual products, and the above-described methods will also lead to increased product costs.

In an in-cell touch liquid crystal panel (in which a touch function is embedded into the liquid crystal panel), in order to reduce parasitic capacitor, usually a guard signal identical to a touch driving signal is applied to a guard electrode, so as to reduce the parasitic capacitor between the touch electrode and other electrode or the signal line; however, in an entire display region, an amplitude of the guard signal and an amplitude of the touch driving signal are relatively great, and the guard signal and the touch driving signal will be generated periodically, so the guard signal and the touch driving signal will become a great interference source of electromagnetic interference. With respect to the in-cell touch liquid crystal panel, main EMI interference sources include the touch driving signal, the guard signal, a gate signal, and a data signal, etc.; at present, various methods have been designed to reduce EMI caused by various signals (i.e., the touch driving signal, the guard signal, the gate signal, and the data signal) in the touch panel, but most of the existing methods become a factor of reducing touch characteristics, which leads to poor touch performance.

At least one embodiment of the present disclosure provides a touch panel. The touch panel includes a touch chip and a touch electrode. The touch chip is configured to generate a touch driving signal and apply the touch driving signal to the touch electrode; the touch electrode is configured to receive the touch driving signal and generate a touch sensing signal based on the touch driving signal; the touch driving signal includes a plurality of sub-signals; the plurality of sub-signals include a first sub-signal and a second sub-signal; and the first sub-signal is different from the second sub-signal.

In the touch panel provided by the embodiment of the present disclosure, by making the touch driving signal be composed of different sub-signals (having different frequencies and/or shapes), concentration of electromagnetic signals may be prevented, thereby reducing EMI of the touch panel and improving performance of the product in the case of minimizing touch performance reduction or without reducing the touch performance and without increasing costs.

At least one embodiment of the present disclosure further provides a touch method, an electronic apparatus, and a non-transitory computer-readable storage medium.

The embodiments of the present disclosure are described in detail below in combination with the accompanying drawings, but the present disclosure is not limited to these specific embodiments.

Figure 1:
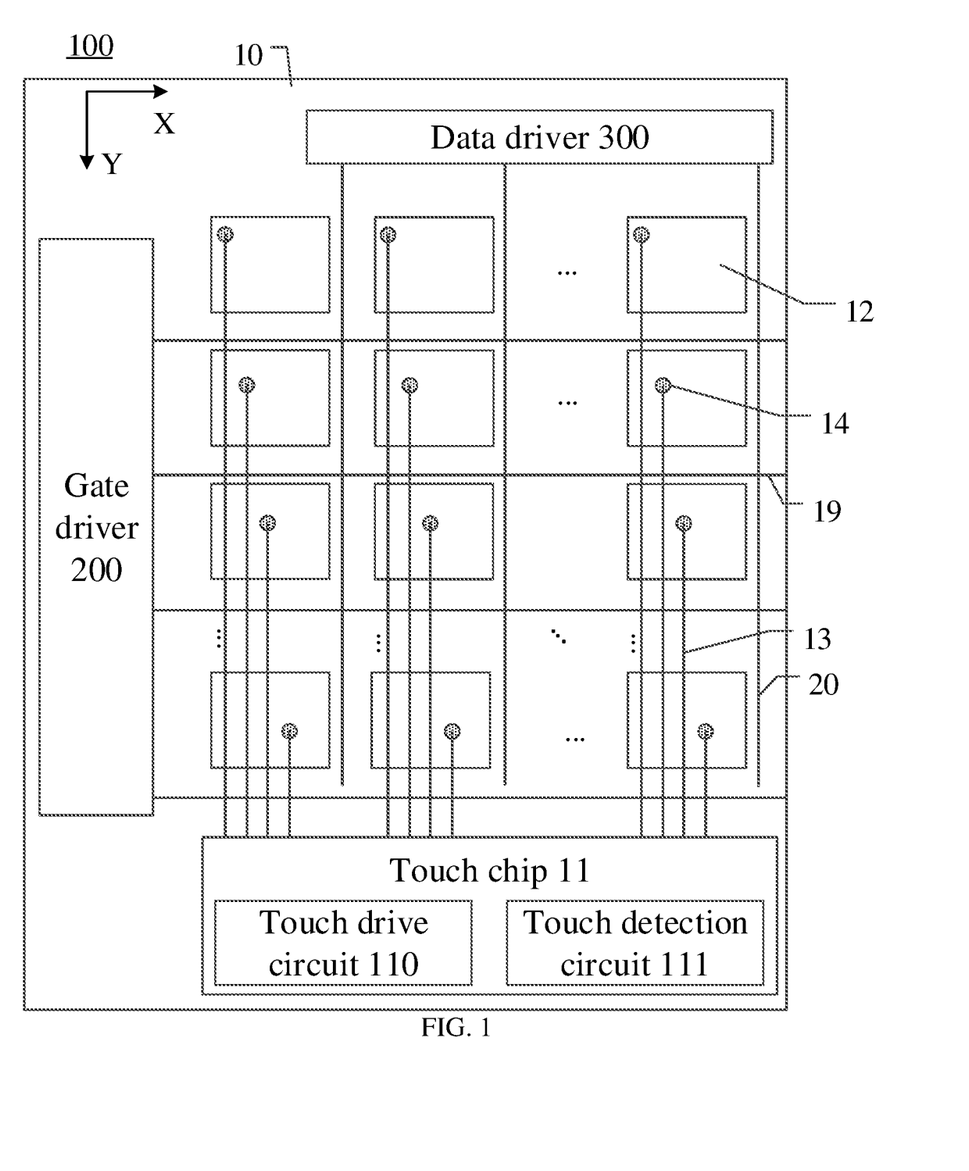
FIG. 1 is a schematic plan view of a touch panel provided by at least one embodiment of the present disclosure.
Figure 2:
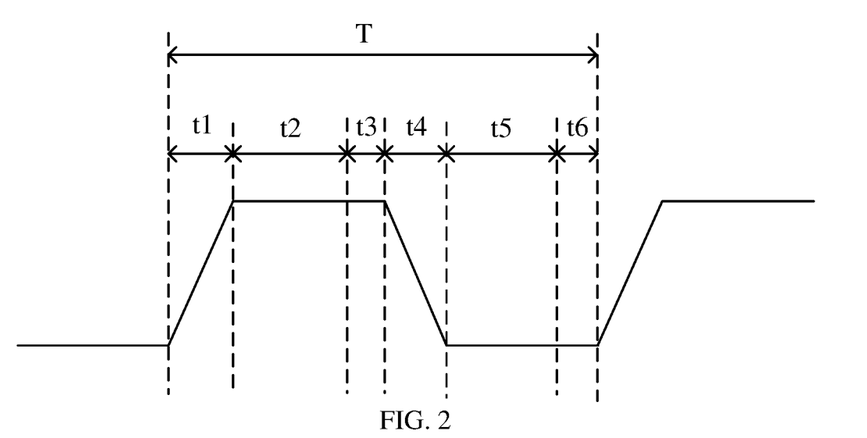
FIG. 2 is a schematic diagram of a sub-signal provided by at least one embodiment of the present disclosure.

FIG. 1 is a schematic plan view of a touch panel provided by at least one embodiment of the present disclosure; and FIG. 2 is a schematic diagram of a sub-signal provided by at least one embodiment of the present disclosure.

For example, as shown in FIG. 1, the touch panel 100 provided by the embodiment of the present disclosure includes a first substrate 10, a touch chip 11, and a touch electrode 12. The touch chip 11 and the touch electrode 12 are both arranged on the first substrate 10. For example, the touch chip 11 is configured to generate a touch driving signal and apply the touch driving signal to the touch electrode 12. For example, the touch electrode 12 is configured to receive the touch driving signal and generate a touch sensing signal based on the touch driving signal. For example, the touch driving signal includes a plurality of sub-signals; the plurality of sub-signals include a first sub-signal and a second sub-signal; and the first sub-signal is different from the second sub-signal.

In the embodiments of the present disclosure, by making at least two sub-signals in the touch driving signal different, the EMI of the touch panel is reduced and the performance of the product is improved without changing a structure of the touch panel.

For example, the touch panel 100 may be an in-cell touch panel, etc. For example, the touch panel 100 is a Full In Cell (FIC) touch panel, which simplifies the structure, reduces costs, improves a touch signal-to-noise ratio, and improves the touch sensitivity.

For example, the touch chip 11 may be provided separately, or may also be integrated with other computing device. For example, the touch chip 11 may be implemented by adopting a special-purpose computing device (e.g., a Digital Signal Processor (DSP), etc.) or a general-purpose computing device (e.g., a Central Processing Unit (CPU), etc.).

For example, each sub-signal has a plurality of characteristics, for each sub-signal, the plurality of characteristics of the sub-signal include a rising edge time period of the sub-signal, a falling edge time period of the sub-signal, and a duration period of the sub-signal. As shown in FIG. 2, in one example, it is illustrated by taking a case that the sub-signal is a trapezoidal wave signal as an example, a duration period of the sub-signal is T, the sub-signal has a rising edge time period t1 and a falling edge time period t4, and the sub-signal also includes two sensing time periods t2 and t5 and two reset time periods t3 and t6. In the sensing time period t2, charges generated by the touch electrode based on the change of the sub-signal in the rising edge time period t1 is sensed, and in the reset time period t3, the touch electrode is reset; in the sensing time period t5, charges generated by the touch electrode based on the change of the sub-signal in the falling edge time period t4 is sensed, and in the reset time period t6, the touch electrode is reset.

It should be noted that, with respect to a signal composed of a plurality of identical sub-signals, the duration period of the sub-signal is a cycle of the signal composed thereby.

For example, as shown in FIG. 2, within the sensing time periods t2 and t5, a level of the sub-signal is a direct-current level, but the present disclosure is not limited thereto. In each time period, a specific shape of the sub-signal may be determined according to actual situations. For example, if the sub-signal is a rectangular wave signal, in this case, the rising edge time period and the falling edge time period of the sub-signal is very small, but not 0, and the sensing time period of the sub-signal is large; if the sub-signal is a triangular wave signal, a sine wave signal, or a cosine wave signal, in this case, during the sensing time period of the sub-signal, the level of the sub-signal is not a direct-current level, but gradually changes, and in this case, the sub-signal does not have a time period when the level of the sub-signal is a direct-current level.

For example, at least one characteristic of the first sub-signal and at least one characteristic of the second sub-signal are different, so that the first sub-signal is different from the second sub-signal. In some embodiments, the above-described plurality of characteristics of the first sub-signal are different from the above-described plurality of characteristics of the second sub-signal, for example, the rising edge time period of the first sub-signal is different from the rising edge time period of the second sub-signal, the falling edge time period of the first sub-signal is different from the falling edge time period of the second sub-signal, and the duration period of the first sub-signal is different from the duration period of the second sub-signal, so that a difference between the first sub-signal and the second sub-signal is greater, which further prevents the concentration of electromagnetic signals.

For example, in some embodiments, the first sub-signal and the second sub-signal are two sub-signals generated adjacent in terms of time, that is, the second sub-signal is generated directly after the first sub-signal is generated. The present disclosure is not limited thereto, the first sub-signal and the second sub-signal may also be two sub-signals that are not adjacent in terms of time, and that is, at least one sub-signal is generated in a time period between the time generating the first sub-signal and the time generating the second sub-signal.

For example, the plurality of sub-signals include a plurality of sub-signal groups, that is, the plurality of sub-signals are divided into the plurality of sub-signal groups; and the plurality of sub-signal groups are identical.

For example, each sub-signal group includes N sub-signals, N is a positive integer greater than 1, the N sub-signals include the first sub-signal and the second sub-signal, that is to say, each sub-signal group includes two different sub-signals. It should be noted that a specific value of N may be set according to actual situations, and the embodiments of the present disclosure do not specifically limit the specific value of N.

Figure 3A:
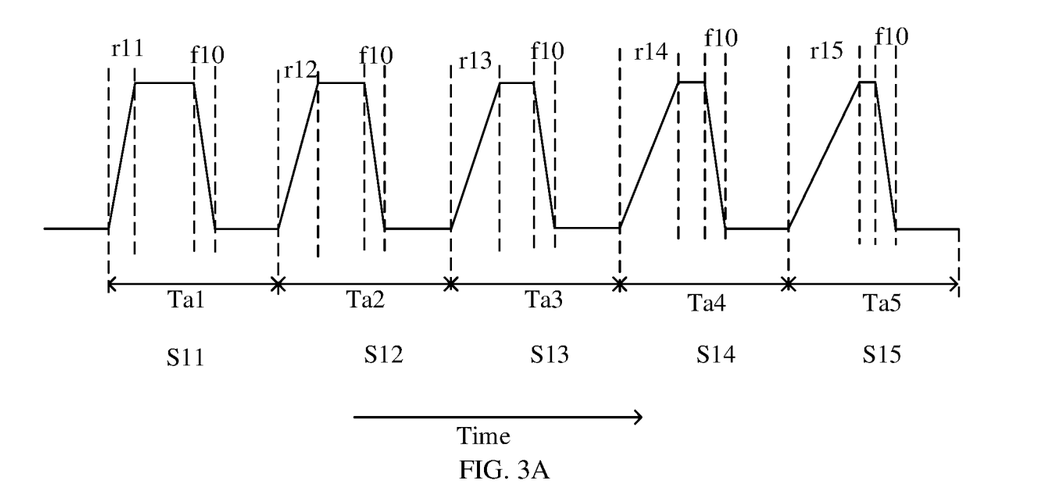
FIG. 3A is a schematic diagram of a sub-signal group provided by at least one embodiment of the present disclosure.
Figure 3B:
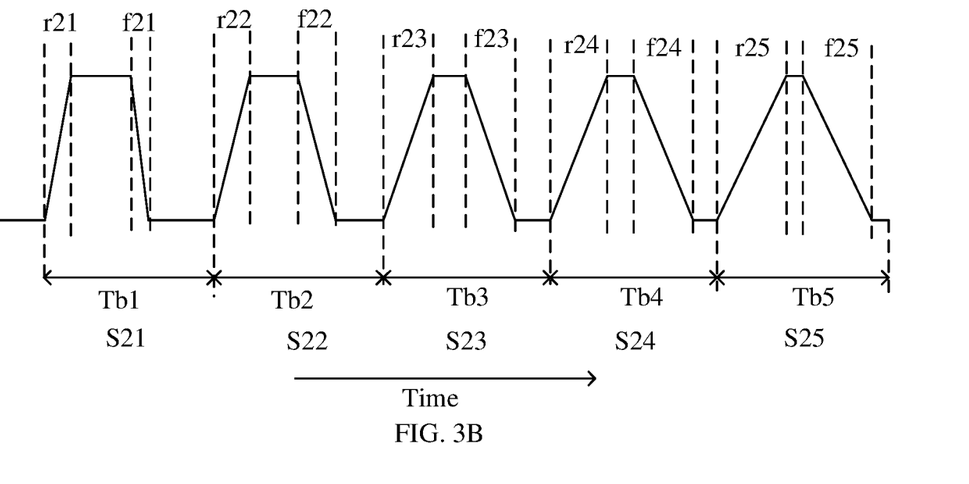
FIG. 3B is a schematic diagram of another sub-signal group provided by at least one embodiment of the present disclosure.
Figure 3C:
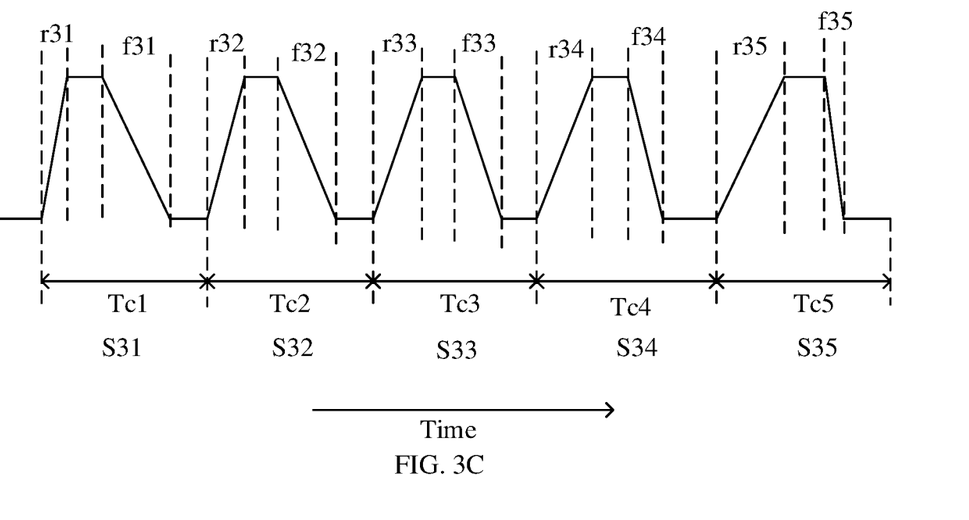
FIG. 3C is a schematic diagram of still another sub-signal group provided by at least one embodiment of the present disclosure.
Figure 3D:
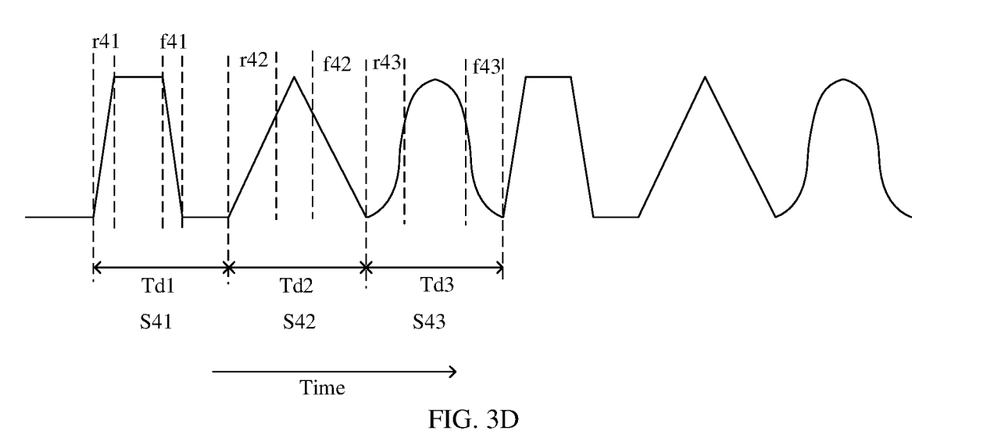
FIG. 3D is a schematic diagram of yet another sub-signal group provided by at least one embodiment of the present disclosure.
Figure 3E:
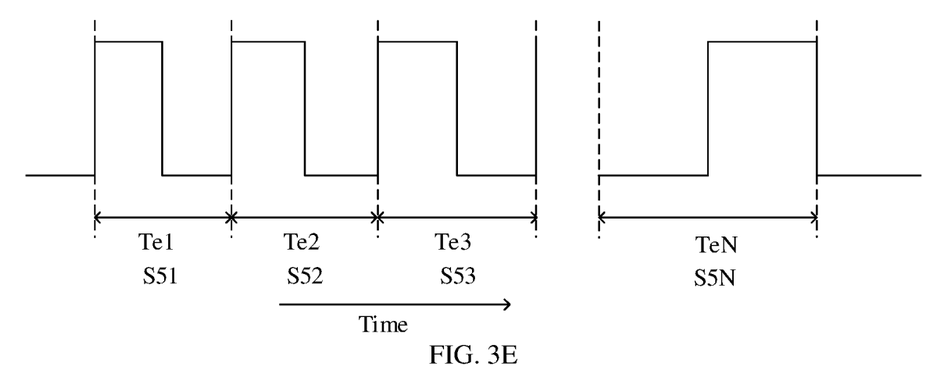
FIG. 3E is a schematic diagram of still yet another sub-signal group provided by at least one embodiment of the present disclosure.

FIG. 3A is a schematic diagram of a sub-signal group provided by at least one embodiment of the present disclosure; FIG. 3B is a schematic diagram of another sub-signal group provided by at least one embodiment of the present disclosure; FIG. 3C is a schematic diagram of still another sub-signal group provided by at least one embodiment of the present disclosure; FIG. 3D is a schematic diagram of yet another sub-signal group provided by at least one embodiment of the present disclosure; and FIG. 3E is a schematic diagram of still yet another sub-signal group provided by at least one embodiment of the present disclosure.

For example, at least two rising edge time periods in N rising edge time periods respectively corresponding to the N sub-signals are different from each other, for example, the N rising edge time periods are different from each other. As shown in FIG. 3A, in some embodiments, N is 5, that is, each sub-signal group includes five sub-signals, namely, a sub-signal S11, a sub-signal S12, a sub-signal S13, a sub-signal S14, and a sub-signal S15. A rising edge time period of the sub-signal S11 is r11, a rising edge time period of the sub-signal S12 is r12, a rising edge time period of the sub-signal S13 is r13, a rising edge time period of the sub-signal S14 is r14, and a rising edge time period of the sub-signal S15 is r15; and five rising edge time periods respectively corresponding to the five sub-signals S11 to S15 are different from each other.

For example, in terms of time, the N sub-signals are generated successively; as shown in FIG. 3A, a line with an arrow marked with time represents a direction of time passing; in terms of time, the five sub-signals S11 to S15 are generated successively, that is, the time at which the sub-signal S11 is generated is earlier than the time at which the sub-signal S12 is generated, the time at which the sub-signal S12 is generated is earlier than the time at which the sub-signal S13 is generated, and so on.

For example, the N rising edge time periods respectively corresponding to the N sub-signals increase or decrease sequentially according to a generation order of the N sub-signals. As shown in FIG. 3A, r11 is smaller than r12, r12 is smaller than r13, r13 is smaller than r14, and r14 is smaller than r15, that is to say, the five rising edge time periods respectively corresponding to the five sub-signals S11 to S15 increase sequentially. The present disclosure is not limited thereto; in other embodiments, the five rising edge time periods respectively corresponding to the five sub-signals S11 to S15 may also decrease in sequence.

It should be noted that some rising edge time periods of the N rising edge time periods respectively corresponding to the N sub-signals may also be identical; in some embodiments, some of the five rising edge time periods r11 to r15 respectively corresponding to the five sub-signals S11 to S15 may also be identical, for example, the rising edge time period r11 to the rising edge time period r13 are the same, the rising edge time period r14 and the rising edge time period 15 are the same, and so on, which will not be specifically limited in the present disclosure, as long as the rising edge time periods of at least two sub-signals of the N sub-signals in each sub-signal group are different from each other, so that at least two sub-signals are different from each other.

For example, in some embodiments, N duration periods respectively corresponding to the N sub-signals are all identical. As shown in FIG. 3A, a duration period of the sub-signal S11 is Ta1, a duration period of the sub-signal S12 is Ta2, a duration period of the sub-signal S13 is Ta3, a duration period of the sub-signal S14 is Ta4, and a duration period of the sub-signal S15 is Ta5. The duration periods Ta1 to Ta5 of the five sub-signals S11 to S15 may be identical, that is, Ta1 to Ta5 are all equal. In other embodiments, the N duration periods corresponding to the N sub-signals are different from each other, for example, the duration periods Ta1 to Ta5 are different from each other.

For example, in some embodiments, the sub-signal S11 may be an example of the first sub-signal, and the sub-signal S12 may be an example of the second sub-signal, and in this case, the first sub-signal and the second sub-signal are two sub-signals generated adjacent in terms of time; in other embodiments, the sub-signal S11 may be an example of the first sub-signal, and the sub-signal S13 may be an example of the second sub-signal, and in this case, the first sub-signal and the second sub-signal are two sub-signals that are not adjacent in terms of time, that is, in terms of time, there is at least one sub-signal, for example, the sub-signal S12, between the first sub-signal and the second sub-signal.

For example, in some embodiments, N falling edge time periods respectively corresponding to the N sub-signals are all identical. As shown in FIG. 3A, falling edge time periods of the sub-signals S11 to S15 are all f10.

For example, in some embodiments, N rising edge time periods respectively corresponding to the N sub-signals are all identical, but at least two falling edge time periods in the N falling edge time periods respectively corresponding to the N sub-signals are different from each other.

For example, in some embodiments, at least two falling edge time periods of the N falling edge time periods respectively corresponding to the N sub-signals are different from each other, for example, the N falling edge time periods are different from each other. For example, as shown in FIG. 3B, in some embodiments, N is 5, that is, each sub-signal group includes five sub-signals, namely, a sub-signal S21, a sub-signal S22, a sub-signal S23, a sub-signal S24, and a sub-signal S25. A falling edge time period of the sub-signal S21 is f21, a falling edge time period of the sub-signal S22 is f22, a falling edge time period of the sub-signal S23 is f23, a falling edge time period of the sub-signal S24 is f24, and a falling edge time period of the sub-signal S25 is f25. The falling edge time period f21 to the falling edge time period f25 respectively corresponding to the five sub-signals S21 to S25 are different from each other.

For example, in terms of time, the N sub-signals are generated successively; as shown in FIG. 3B, a line with an arrow marked with time represents a direction of time passing; in terms of time, the five sub-signals S21 to S25 are generated successively, that is, the time at which the sub-signal S21 is generated is earlier than the time at which the sub-signal S22 is generated, the time at which the sub-signal S22 is generated is earlier than the time at which the sub-signal S23 is generated, and so on.

For example, the N falling edge time periods respectively corresponding to the N sub-signals increase or decrease sequentially according to a generation order of the N sub-signals. As shown in FIG. 3B, f21 is less than f22, f22 is less than f23, f23 is less than f24, f24 is less than f25, that is to say, the five falling edge time periods respectively corresponding to the five sub-signals S21 to S25 increase in turn. The present disclosure is not limited thereto, and in other embodiments, the five falling edge time periods f21 to f25 respectively corresponding to the five sub-signals S21 to S25 may also decrease in turn.

For example, as shown in FIG. 3B, a rising edge time period of the sub-signal S21 is r21, a rising edge time period of the sub-signal S22 is r22, a rising edge time period of the sub-signal S23 is r23, a rising edge time period of the sub-signal S24 is r24, and a rising edge time period of the sub-signal S25 is r25. The rising edge time period r21 to the rising edge time period r25 are different from each other. For example, the rising edge time period r21 to the rising edge time period r25 increase sequentially.

For example, as shown in FIG. 3B, a duration period of the sub-signal S21 is Tb1, a duration period of the sub-signal S22 is Tb2, a duration period of the sub-signal S23 is Tb3, a duration period of the sub-signal S24 is Tb4, and a duration period of the sub-signal S25 is Tb5. In some embodiments, the duration periods Tb1 to Tb5 respectively corresponding to the five sub-signals S21 to S25 may be identical, that is, Tb1 to Tb5 are equal. In other embodiments, the duration periods Tb1 to Tb5 of the five sub-signals S21 to S25 may also be different from each other.

For example, as shown in FIG. 3C, in some embodiments, N is 5, that is, each sub-signal group includes five sub-signals, namely, a sub-signal S31, a sub-signal S32, a sub-signal S33, a sub-signal S34, and a sub-signal S35. Rising edge time periods of the five sub-signals S31 to S35 are different from each other, and falling edge time periods of the five sub-signals S31 to S35 are different from each other. As shown in FIG. 3C, a rising edge time period of the sub-signal S31 is r31, a rising edge time period of the sub-signal S32 is r32, a rising edge time period of the sub-signal S33 is r33, a rising edge time period of the sub-signal S34 is r34, a rising edge time period of the sub-signal S35 is r35, and the rising edge time period S31 to the rising edge time period r35 are different from each other. A falling edge time period of the sub-signal S31 is f31, a falling edge time period of the sub-signal S32 is f32, a falling edge time period of the sub-signal S33 is f33, a falling edge time period of the sub-signal S34 is f34, a falling edge time period of the sub-signal S35 is f35, and the falling edge time period f31 to the falling edge time period f35 are different from each other.

For example, as shown in FIG. 3C, in terms of time, the five sub-signals S31 to S35 are generated successively; according to a generation order of the sub-signals S31 to S35, the rising edge time period r31 to the rising edge time period r35 increase in turn, and the falling edge time period f31 to the falling edge time period f35 decrease in turn.

For example, as shown in FIG. 3C, among the five sub-signals S31 to S35, the five sensing time periods respectively corresponding to the five sub-signals S31 to S35 are roughly identical, for example, by controlling specific values of the rising edge time period r31 to the rising edge time period r35 and the falling edge time period f31 to the falling edge time period f35, the five sensing time periods respectively corresponding to the five sub-signals S31 to S35 may be identical, so as to enhance sensing uniformity and improve touch performance, while avoiding the problem that sensing time period of a certain sub-signal is too small to sense the signal.

For example, as shown in FIG. 3C, a duration period of the sub-signal S31 is Tc1, a duration period of the sub-signal S32 is Tc2, a duration period of the sub-signal S33 is Tc3, a duration period of the sub-signal S34 is Tc4, and a duration period of the sub-signal S35 is Tc5. In some embodiments, the duration periods Tc1 to Tc5 of the five sub-signals S31 to S35 may be identical, that is, Tc1 to Tc5 are all equal. In other embodiments, the duration periods Tc1 to Tc5 of the five sub-signals S31 to S35 may also be different from each other.

For example, in some embodiments, the N sub-signals in each sub-signal group may be signals of different types, for example, the N sub-signals further include a third sub-signal; the first sub-signal is a triangular wave signal, the second sub-signal is a sine wave signal, and the third sub-signal is a trapezoidal wave signal, that is to say, the triangular wave signal, the sine wave signal, and the trapezoidal wave signal may be taken as a repetition group to be repeated over and over again, so as to create a touch driving signal. FIG. 3D shows two sub-signal groups; as shown in FIG. 3D, N may be 3, that is, each sub-signal group includes three sub-signals, namely, a sub-signal S41, a sub-signal S42, and a sub-signal S43. For example, the sub-signal S41 is an example of the third sub-signal, that is, the sub-signal S41 is a trapezoidal wave signal; the sub-signal S42 is an example of the first sub-signal, that is, the sub-signal S42 is a triangular wave signal; and the sub-signal S43 is an example of the second sub-signal, that is, the sub-signal S43 is a sine wave signal. For example, a rising edge time period of the sub-signal S41 is r41, a rising edge time period of the sub-signal S42 is r42, and a rising edge time period of the sub-signal S43 is r43. A falling edge time period of the sub-signal S41 is f41, a falling edge time period of the sub-signal S42 is f42, and a falling edge time period of the sub-signal S43 is f43. For example, the rising edge time period r41 to the rising edge time period r43 may be different from each other, and the falling edge time period f41 to the falling edge time period f43 may also be different from each other.

It should be noted that types of the N sub-signals will not be specifically limited in the embodiments of the present disclosure. In addition, as shown in FIG. 3D, the trapezoidal wave signal, the triangular wave signal, and the sine wave signal are generated successively, but the embodiments of the present disclosure do not limit a generation order of the N sub-signals of different types. For example, in some examples, in terms of time, the trapezoidal wave signal, the sine wave signal, and the triangular wave signal are generated successively, or the triangular wave signal, the trapezoidal wave signal, and the sine wave signal are generated successively, and so on. In addition, in the N sub-signals, the number of sub-signals of each type is at least one, for example, in some examples, N is 5, that is, each sub-signal group includes five sub-signals, and the five sub-signals may include two trapezoidal wave signals, two triangular wave signals, and one sine wave signal, or the five sub-signals may include three trapezoidal wave signals, one triangular wave signal, and one sine wave signal, and so on.

For example, as shown in FIG. 3D, a duration period of the sub-signal S41 is Td1, a duration period of the sub-signal S42 is Td2, and a duration period of the sub-signal S43 is Td3. In some embodiments, the duration periods Td1 to Td3 of the three sub-signals S41 to S43 may be identical, that is, Td1 to Td3 are all equal. In other embodiments, the duration periods Td1 to Td3 of the three sub-signals S41 to S43 may also be different from each other.

For example, in some embodiments, in each sub-signal group, the rising edge time period and the falling edge time period of each sub-signal may be identical; as shown in FIG. 3B, the rising edge time period r21 and the falling edge time period f21 of the sub-signal S21 may be identical, the rising edge time period r22 and the falling edge time period f22 of the sub-signal S22 may be identical, the rising edge time period r23 and the falling edge time period f23 of the sub-signal S23 may be identical, the rising edge time period r24 and the falling edge time period f24 of the sub-signal S24 may be identical, and the rising edge time period r25 and the falling edge time period f25 of the sub-signal S25 may be identical; as shown in FIG. 3D, the rising edge time period r41 and the falling edge time period f41 are identical, the rising edge time period r42 and the falling edge time period f42 are identical, and the rising edge time period r43 and the falling edge time period f4 are identical.

For example, in some embodiments, in each sub-signal group, the rising edge time period and the falling edge time period of each sub-signal may be different from each other; as shown in FIG. 3A, the rising edge time period r11 and the falling edge time period 110 of the sub-signal S11 are different from each other, the rising edge time period r12 and the falling edge time period f10 of the sub-signal S12 are different from each other, the rising edge time period r13 and the falling edge time period f10 of the sub-signal S13 are different from each other, the rising edge time period r14 and the falling edge time period f10 of the sub-signal S14 are different from each other, and the rising edge time period r15 and the falling edge time period f10 of the sub-signal S15 are different from each other.

For example, in some embodiments, in each sub-signal group, the rising edge time period and the falling edge time period of each of part sub-signals are different from each other, and the rising edge time period and the falling edge time period of each of other part sub-signals are identical; as shown in FIG. 3C, the rising edge time period r33 and the falling edge time period f33 of the sub-signal S33 are identical, while the rising edge time period r31 and the falling edge time period f31 of the sub-signal S31 are different from each other, the rising edge time period r32 and the falling edge time period f32 of the sub-signal S32 are different from each other, the rising edge time period r34 and the falling edge time period f34 of the sub-signal S34 are different from each other, and the rising edge time period r35 and the falling edge time period f35 of the sub-signal S35 are different from each other.

For example, in some embodiments, at least two duration periods among the N duration periods respectively corresponding to the N sub-signals are different from each other, for example, the N duration periods are different from each other. For example, as shown in FIG. 3E, in some embodiments, the N sub-signals in each sub-signal group are all rectangular wave signals, which are respectively sub-signals S51, S52, S53, ..., and S5N. As shown in FIG. 3E, a duration period of the sub-signal S51 is Te1, a duration period of the sub-signal S52 is Te2, a duration period of the sub-signal S53 is Te3, and so on; a duration period of the sub-signal S5N is TeN, and the duration periods Te1 to TeN are different from each other. Because signals with the same frequency concentrate energy in one frequency band, in order to prevent such case, in the example shown in FIG. 3E, energies of signals are dispersed by making the respective sub-signals have different duration periods, so as to reduce or eliminate EMI.

For example, in terms of time, the N sub-signals are generated successively, as shown in FIG. 3E, a line with an arrow marked with time represents a direction of time passing; in terms of time, N sub-signals SM to S5N are generated successively, N duration periods respectively corresponding to the N sub-signals increase or decrease sequentially according to a generation order of the N sub-signals.

As shown in FIG. 3E, according to the generation order of the sub-signals S51 to S5N, the duration periods Te1 to TeN increase in turn.

For example, in some embodiments, in each sub-signal group, a difference between duration periods of two sub-signals, generated adjacent in terms of time, among the N sub-signals is a fixed value. As shown in FIG. 3E, a difference between the duration period Te1 and the duration period Te2 is a fixed value $\Delta$, that is, Te2=Te1+$\Delta$, a difference between the duration period Te2 and the duration period Te3 is a fixed value 4, that is, Te3=Te2+$\Delta$=Te1+2*$\Delta$, and so on. It may be known that a difference between the duration period TeN and the duration period Te1 is (N-1)*$\Delta$, that is, TeN=Te1+(N-1)*$\Delta$.

For example, in the example shown in FIG. 3E, a value of N may range from 10 to 30.

For example, in other embodiments, in each sub-signal group, a difference between duration periods of any two sub-signals, generated adjacent in terms of time, among the N sub-signals is not fixed, and for example, may be a random value. For example, a difference between the duration period Te1 and the duration period Te2 is 41, that is Te2=Te1+$\Delta$1, a difference between the duration period Te2 and the duration period Te3 is $\Delta$2, that is, Te3=Te2+$\Delta$2, and so on. $\Delta$1 and $\Delta$2 are different from each other. For another example, a difference between the duration period Te1 and the duration period Te2 is $\Delta$1, that is, Te2=Te1+$\Delta$1, a difference between the duration period Te2 and the duration period Te3 is also 41, that is, Te3=Te2+$\Delta$1, a difference between the duration period Te3 and the duration period Te4 (e.g., the duration period Te3 and the duration period Te4 represent duration periods corresponding to two sub-signals generated adjacent in terms of time) is $\Delta$2, that is, Te4=Te3+$\Delta$2, and so on. $\Delta$1 and $\Delta$2 are different from each other.

For example, in the example shown in FIG. 3E, the N rising edge time periods respectively corresponding to the N sub-signals are all identical, and the N falling edge time periods respectively corresponding to the N sub-signals are also identical.

It should be noted that the examples shown in FIG. 3A to FIG. 3D may be combined with each other in case of no contradiction. For example, in some embodiments, the plurality of sub-signal groups may include at least one first sub-signal group and at least one second sub-signal group; and the first sub-signal group is different from the second sub-signal group; for example, each first sub-signal group may be a sub-signal group shown in FIG. 3A, each second sub-signal group may be a sub-signal group shown in FIG. 3B, or, each first sub-signal group may be a sub-signal group shown in FIG. 3A, and each second sub-signal group may be a sub-signal group shown in FIG. 3D or FIG. 3E, and so on, so that a difference between different sub-signals in the touch driving signal is greater, further preventing the concentration of electromagnetic signals. For another example, the plurality of sub-signal groups may also include more different types of sub-signal groups, which will not be specifically limited in the embodiments of the present disclosure.

For example, in some embodiments, amplitudes of the plurality of sub-signals in the touch driving signal may be identical, so as to ensure that the touch performance does not decline or the decline of the touch performance is minimized.

For example, as shown in FIG. 1, the touch panel 100 further includes a touch signal line 13, the touch electrode 12 is connected to the touch chip 11 through the touch signal line 13, the touch chip 11 transmits the touch driving signal to the touch electrode 12 through the touch signal line 13, and the touch chip 11 receives the touch sensing signal generated by the touch electrode 12 through the touch signal line 13. The touch chip 11 may implement the touch detection based on the touch driving signal and the touch sensing signal, so as to implement the touch function.

For example, as shown in FIG. 1, the touch panel 100 includes a plurality of touch electrodes 12 and a plurality of touch signal lines 13, the plurality of touch electrodes 12 are arranged in an array with a plurality of rows and a plurality of columns; these touch electrodes 12 form a self-capacitance electrode array, which may be used for touch detection. The plurality of touch signal lines 13 and the plurality of touch electrodes 12 are respectively electrically connected in one-to-one correspondence, to implement separate detection of each touch electrode 12, so as to implement a multi-point touch function. The plurality of touch signal lines 13 all extend along a column direction of the plurality of touch electrodes 12, and the plurality of touch signal lines 13 are arranged along a row direction of the plurality of touch electrodes 12. For example, the row direction of the plurality of touch electrodes 12 is an X direction shown in FIG. 1, and the column direction of the plurality of touch electrodes 12 is a Y direction shown in FIG. 1. For example, the X direction and the Y direction may be perpendicular to each other.

For example, the touch signal line 13 and the touch electrode 12 may be located in different layers; and at least one structural layer (e.g., including an insulating layer) is arranged between the touch signal line 13 and the touch electrode 12. As shown in FIG. 1, the touch signal line 13 may be electrically connected with the touch electrode 12 through a connection hole 14 penetrating through the at least one structural layer. For example, the number of the connection hole(s) 14 for each touch electrode 12 may be one or more; and a plurality of connection holes 14 may reduce contact resistance between the touch electrode 12 and the touch signal line 13. As shown in FIG. 1, in one example, the number of the connection hole(s) 14 is one.

For example, the plurality of touch signal lines 13 are insulated from each other. For example, the plurality of touch signal lines 13 may be located in the same layer. For example, in a preparation process, the plurality of touch signal lines 13 may be formed using the same metal thin film through the same patterning process, thereby simplifying the preparation process of the touch panel, saving production costs, and facilitating wiring.

For example, the plurality of touch electrodes 12 may have the same shape, so as to ensure that the characteristics of the plurality of touch electrodes 12 are substantially consistent, and thus ensuring the accuracy of touch detection. But the present disclosure is not limited thereto, the plurality of touch electrodes 12 may also have different shapes. For example, as shown in FIG. 1, a shape of the touch electrode 12 may be a rectangle, for example, a square. But the present disclosure is not limited thereto, according to actual design requirements, the shape of the touch electrode 12 may also be round, trapezoidal, etc. The embodiments of the present disclosure do not specifically limit the shape of the touch electrode 12.

For example, the touch panel 100 may further be configured to display an image, that is, the touch panel and the display panel are integrated as a whole. For example, the touch panel 100 may be a liquid crystal display panel, the liquid crystal display panel includes a common electrode, and the touch electrode 12 may include the common electrode, or be obtained by multiplexing the common electrode.

For another example, the touch panel 100 may also be an organic light emitting display panel, the organic light emitting display panel includes a light emitting diode, the light emitting diode may be an organic light emitting diode (OLED), a quantum dot light emitting diode (QLED), etc. The touch electrode 12 may include a cathode or an anode of the light emitting diode, or be obtained by multiplexing the cathode or the anode. That is to say, the touch electrode 12 that implements the touch function may be integrated in the display panel. Without adding additional processes, the integration of touch and display may be implemented through multiplexing in a time-sharing manner, which reduces production costs, reduces volume and weight of the display panel, and improves an added value of the product. Meanwhile, in the case that the touch panel 100 is a curved display panel, the touch panel 100 may improve the stability of flexible display.

For example, the touch electrode 12 may be a transparent electrode. Materials of the transparent electrode may include, for example, Indium Tin Oxide (ITO), Indium Zinc Oxide (IZO), Indium Gallium Oxide (IGO), Gallium Zinc Oxide (GZO), Zinc Oxide (ZnO), Indium Oxide ($In_2O_3$), Aluminum Zinc Oxide (AZO), carbon nanotubes, and the like.

For example, the touch signal line 13 may be prepared from a transparent conductive material. The transparent conductive material may be Indium Tin Oxide (ITO), etc.

For example, the first substrate 10 may be a transparent insulating substrate, and the transparent insulating substrate may be, for example, a glass substrate, a quartz substrate, or other suitable substrate.

Figure 4:
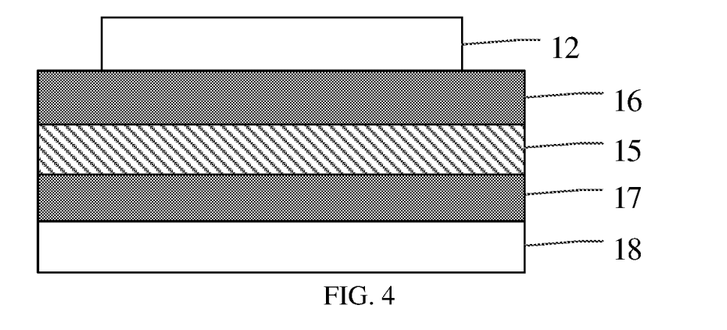
FIG. 4 is a structural schematic diagram of a touch electrode provided by at least one embodiment of the present disclosure.

FIG. 4 is a structural schematic diagram of a touch electrode provided by at least one embodiment of the present disclosure.

For example, in some embodiments, as shown in FIG. 4, the touch panel further includes a guard electrode 15. The touch chip 11 is configured to apply the touch driving signal to the touch electrode 12 in a touch phase, the touch chip 11 is further configured to generate and apply a guard signal to the guard electrode 15 in the touch phase, and the guard signal is identical to the touch driving signal, so that parasitic capacitance between the touch electrode 12 and a ground electrode 18 may be reduced or eliminated. "The guard signal being identical to the touch driving signal" may indicate that all characteristics of the guard signal (e.g., the rising edge time period, the falling edge time period, the duration period, the amplitude, etc.) are respectively identical to all characteristics of the touch driving signal. For example, the ground electrode 18 may represent a conductive element (e.g., an electrode and/or a signal line) in the touch panel other than the touch electrode 12.

It should be noted that when the touch panel is not provided with the guard electrode 15, the parasitic capacitance between the touch electrode 12 and the ground electrode 18 is large, which will affect the touch performance and even lead to the failure to implement the touch function; when the touch panel is provided with the guard electrode 15, the parasitic capacitance between the touch electrode 12 and the ground electrode 18 may be eliminated; moreover, because the touch driving signal applied to the touch electrode 12 is identical to the guard signal applied to the guard electrode 15, no parasitic capacitance will be generated between the touch electrode 12 and the guard electrode 15.

For example, as shown in FIG. 4, a dielectric layer 16 is arranged between the touch electrode 12 and the guard electrode 15; a dielectric layer 17 is arranged between the ground electrode 18 and the guard electrode 15; and the dielectric layer 16 and the dielectric layer 17 are both made of a glass fiber epoxy resin material.

For example, in some embodiments, the touch panel 100 is a liquid crystal panel, and the touch panel 100 further includes a data line, a gate line, a pixel electrode, and a transistor. A gate electrode of the transistor is electrically connected with the gate line, a first electrode of the transistor is electrically connected with the data line, a second electrode of the transistor is electrically connected with the pixel electrode, the transistor is configured to be turned on or off under control of a gate signal supplied by the gate line, when the transistor is turned on, a data signal on the data line is transmitted to the pixel electrode through the transistor, so as to drive liquid crystal molecules in the liquid crystal panel to rotate.

For example, in some embodiments, the data line and/or the gate line may be multiplexed as the guard electrode 15, that is, in the touch phase, the guard signal is transmitted to the guard electrode 15, so that the data line and/or the gate line are multiplexed in a time-sharing manner, without changing a structure of the touch panel, so as to reduce or eliminate the parasitic capacitance between the touch electrode 12 and the data line and/or the gate line and improve the touch performance.

For example, in a direction perpendicular to the first substrate 10, each touch electrode 12 may overlap with at least one pixel electrode. "Overlapping" may include completely overlapping or partially overlapping.

For example, as shown in FIG. 1, the touch panel may further include a plurality of gate lines 19 and a plurality of data lines 20. The plurality of gate lines 19 extend along the row direction of the plurality of touch electrodes 12, and are sequentially arranged along the column direction of the plurality of touch electrodes 12. The plurality of data lines 20 extend along the column direction of the plurality of touch electrodes 12, and are sequentially arranged along the row direction of the plurality of touch electrodes 12. For example, the plurality of gate lines 19 are insulated from each other, and the plurality of data lines 20 are also insulated from each other.

For example, as shown in FIG. 1, an extension direction of the touch signal line 13 may be the same as an extension direction of the data line 20. But the present disclosure is not limited thereto, the extension direction of the touch signal line 13 may also be the same as an extension direction of the gate line 19.

For example, the touch signal line 13 may also be formed in the same layer as the data line 20/or the gate line 19, so as to simplify the preparation process of the touch panel and facilitate wiring. The touch signal line 13 may also be located in a layer different from the data line 20/or the gate line 19, which will not be specifically limited in the present disclosure.

For example, as shown in FIG. 1, the plurality of gate lines 19 and the plurality of touch signal lines 13 intersect with and are insulated from each other.

For example, the transistor may be a thin film transistor, a field effect transistor, or other switching device with the same characteristics. The thin film transistor may include an oxide thin film transistor, an amorphous silicon thin film transistor, or a polycrystalline silicon thin film transistor, etc.

For example, the touch signal line 13 may also be located in the same layer as the gate electrode or the first electrode/ second electrode of the transistor, so that the touch signal line 13 and the gate electrode or the first electrode/second electrode of the transistor may be formed by using the same patterning process at the same time, so as to simplify the preparation process.

For example, the transistor may adopt a bottom gate structure or a top gate structure, which will not be limited in the embodiments of the present disclosure.

For example, the touch panel 100 may further be configured to display an image, and the first substrate 10 is provided on a display side of the touch panel 100.

For example, the touch panel 100 may be a liquid crystal touch panel, the touch panel 100 may further include a second substrate provided oppositely with the first substrate 10, and liquid crystal molecules are between the first substrate 10 and the second substrate. For example, the first substrate is an opposing substrate and the second substrate is an array substrate. For example, the opposing substrate is a color filter substrate, in this case, the first substrate 10 is further provided with a color filter layer and a polarizing layer. The data line, the gate line, the pixel electrode, and the transistor, etc. may be arranged on the second substrate. The touch electrode 12 is arranged on a side of the first substrate 10 that is close to the second substrate.

For example, as shown in FIG. 1, the touch panel provided by the embodiment of the present disclosure further includes a gate driver 200 and a data driver 300. The data driver 300 is configured to supply the data signal to the data line 20. The gate driver 200 is configured to supply the gate signal to the gate line 19.

For example, each of the gate driver 200 and the data driver 300 may be implemented by an application specific integrated circuit (ASIC) chip.

For example, as shown in FIG. 1, the touch chip 11 may include a touch drive circuit 110 and a touch detection circuit 111. The touch drive circuit 110 is configured to supply touch driving signals to the plurality of touch signal lines 13. The touch detection circuit 111 is configured to detect the touch sensing signals output by the plurality of touch signal lines 13. In addition, the touch driving signals are also transmitted to the touch detection circuit 111. For example, the touch detection circuit 111 performs calculation based on the touch driving signal and the touch sensing signal to determine a touch position, thereby implementing a touch operation.

For example, both the touch drive circuit 110 and the touch detection circuit 111 may be implemented by hardware circuits. For example, the touch drive circuit 110 and the touch detection circuit 111 may be implemented by Field Programmable Gate Array (FPGA) and Digital Signal Processing (DSP), etc.

For example, the touch drive circuit 110 and the touch detection circuit 111 may be implemented by the same integrated circuit chip. For example, the touch drive circuit 110 and the touch detection circuit 111 may be integrated on the same touch chip 11.

For example, when the extension direction of the touch signal line 13 and the extension direction of the data line 20 are the same, the data driver and the touch chip may be arranged together.

For example, the touch panel further includes a controller (not shown, the controller may be a timing controller). The controller is signal-coupled to the gate driver 200, the data driver 300, and the touch chip 11, and is configured to supply a control instruction and/or a timing signal to the gate driver 200, the data driver 300, and the touch chip 11, to make the gate driver 200, the data driver 300, and the touch chip 11 operate together.

For example, in the touch phase, the controller may control the touch chip 11 to generate and output the touch driving signal, the touch signal line 13 may transmit the touch driving signal from the touch chip 11 to the touch electrode 12, and meanwhile, the touch signal line 13 transmits the touch sensing signal generated by the touch electrode 12 to the touch chip 11, so that the touch panel may implement the touch function. In a display phase, the controller may control the gate driver 200 to generate and output the gate signal, the gate line 19 transmits the gate signal to the gate electrode of the transistor, in this case, the transistor is turned on, the controller may also control the data driver 300 to generate and output the data signal, and the data line 20 may transmit the data signal to the pixel electrode through the turned-on transistor, so as to implement the display function of the touch panel.

For example, in the touch phase, the controller may also control both the data driver 300 and the gate driver 200 to output signals, so that the data line and the gate line are floating, or, the controller may control the touch chip 11 to generate and output the guard signal to the data line and the gate line, so as to avoid generating the parasitic capacitance between the touch electrode used to generate the touch sensing signal and the data line as well as the gate line, thereby enhancing the touch accuracy and improving the touch performance; and in the display phase, the controller may also control the touch chip 11 not to output the touch driving signal to the touch signal line, that is, the touch signal line is floating.

Figure 5:
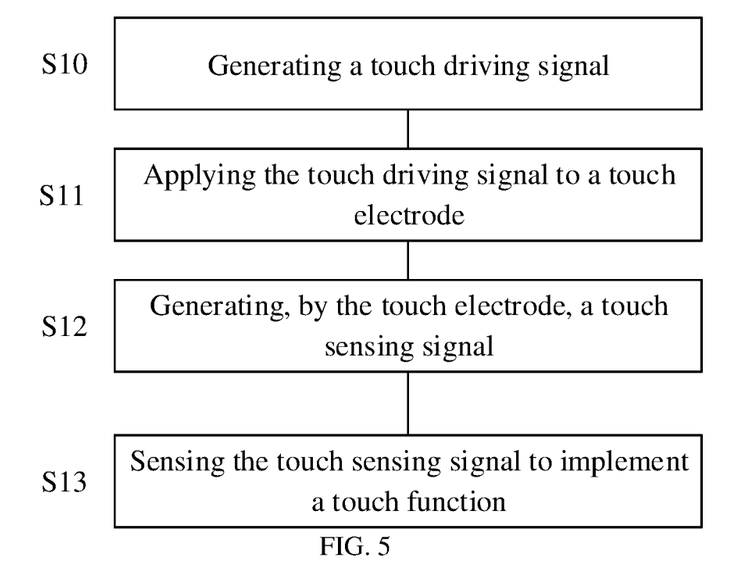
FIG. 5 is a schematic flow chart of a touch method provided by at least one embodiment of the present disclosure.

FIG. 5 is a schematic flow chart of a touch method provided by at least one embodiment of the present disclosure.

At least one embodiment of the present disclosure further provides a touch method, and the touch method may be applied to the touch panel according to any one embodiment of the present disclosure, for example, the above-described touch panel 100.

For example, as shown in FIG. 5, the touch method may include steps S10 to S13 below, and the steps S10 to S13 are all performed in the touch phase.

Step S10: generating a touch driving signal.

Step S11: applying the touch driving signal to a touch electrode.

Step S12: generating, by the touch electrode, a touch sensing signal.

Step S13: sensing the touch sensing signal to implement a touch function.

For example, in the step S10 and the step S11, the touch chip may generate and output a plurality of touch driving signals, and then the plurality of touch signal lines may simultaneously transmit the plurality of touch driving signals respectively to a plurality of touch electrodes.

For example, in the step S12, the touch electrode generates the touch sensing signal based on a change of the touch driving signal.

For example, in the step S13, the touch chip may read a plurality of touch sensing signals on the plurality of touch electrodes through the plurality of touch signal lines, to implement the touch function.

It should be noted that for relevant description of a specific structure of the touch panel, the touch driving signal, the touch sensing signal, and the touch electrode, etc., reference may be made to the description of the above embodiments of the touch panel, and no details will be repeated here.

For example, in some embodiments, in a case where the touch panel includes a guard electrode, the touch method further includes: in the touch phase, generating a guard signal, and applying the guard signal to the guard electrode. For example, the guard signal is identical to the touch driving signal.

The touch method may achieve the same technical effect as the touch panel, and no details will be repeated here.

At least one embodiment of the present disclosure further provides a driving method for driving a touch panel. For example, the touch panel 100 may also be configured to display an image, that is, the touch panel is a touch display panel, and in this case, the driving method for driving the touch panel may include a display phase and a touch phase.

The driving method may include: in the display phase, transmitting a data signal to a pixel electrode to implement a display function; and in the touch phase, transmitting a touch driving signal to the touch electrode and sensing a touch sensing signal generated by the touch electrode to implement a touch function.

For example, a timing chart for driving the touch panel may be set according to actual needs, and will not be specifically limited in the embodiments of the present disclosure.

For example, a time length of the touch phase may be less than a time length of the display phase, but the embodiments of the present disclosure are not limited thereto. For example, according to actual application requirements, the time length of the touch phase may be equal to the time length of the display phase, and the time length of the touch phase may also be equal to half or one tenth of the time length of the display phase. The embodiments of the present disclosure are not limited thereto.

The operations of the above-described driving method are not performed in sequence, nor is it required that each display phase should be accompanied by a touch phase, or each touch phase should be accompanied by a display phase; under a condition of meeting touch time accuracy, one touch phase may be set for every two or more display phases, thereby reducing power consumption; or one display phase may also be set for every two or more touch phases.

According to actual application requirements, the driving method may further include a compensation phase, a reset phase, and an initialization phase, etc. The compensation phase, the reset phase, and the initialization phase may be located in a period before the display phase. For another example, one compensation phase, one reset phase, and one initialization phase may be set for a plurality of display phases.

Figure 6:
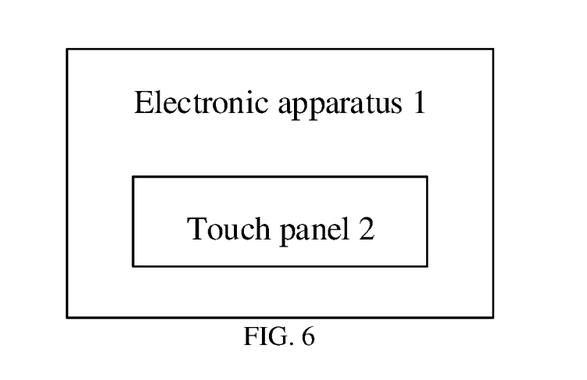
FIG. 6 is a schematic block diagram of an electronic apparatus provided by at least one embodiment of the present disclosure.

FIG. 6 is a schematic block diagram of an electronic apparatus provided by at least one embodiment of the present disclosure.

For example, as shown in FIG. 6, the electronic apparatus 1 includes a touch panel 2 provided by any one embodiment of the present disclosure. The touch panel 2 may be the above-described touch panel 100.

For example, the touch panel 2 may be a rectangular touch panel, a circular touch panel, an elliptical touch panel, or a polygonal touch panel, etc. In addition, the touch panel 2 may be not only a planar touch panel, but also a curved touch panel, or even a spherical touch panel.

For example, the electronic apparatus 1 provided by the embodiment of the present disclosure may a mobile phone, a tablet personal computer, a television, a monitor, a laptop, a digital photo frame, a navigator, and any other product or component having a touch function.

It should be noted that other components of the electronic apparatus 1 (e.g., a control apparatus, an image data encoding/decoding apparatus, a row scanning driver, a column scanning driver, a clock circuit, etc.) will be understood by those skilled in the art, no details will be repeated here, and should not be construed to limit the present disclosure.

The electronic apparatus 1 provided by the embodiment of the present disclosure may achieve the same technical effect as the touch panel provided by the embodiment of the present disclosure.

Figure 7:
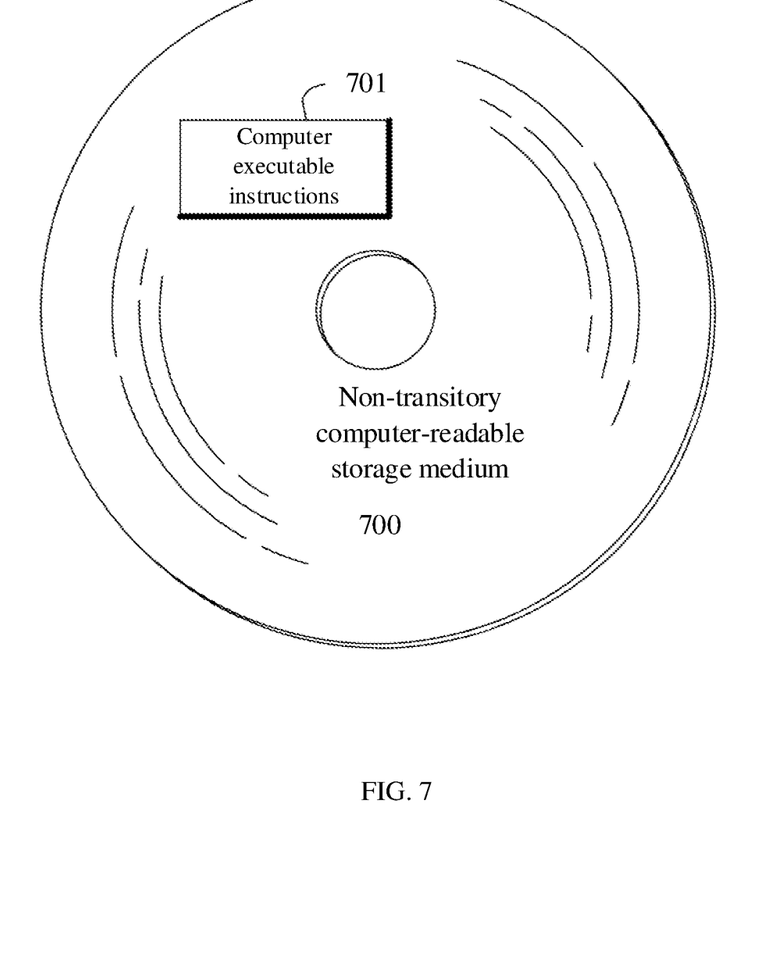
FIG. 7 is a schematic diagram of a non-transitory computer-readable storage medium provided by at least one embodiment of the present disclosure.

At least one embodiment of the present disclosure further provides a non-transitory computer-readable storage medium, and FIG. 7 is a schematic diagram of a non-transitory computer-readable storage medium provided by at least one embodiment of the present disclosure.

For example, as shown in FIG. 7, the non-transitory computer-readable storage medium 700 may store one or more computer executable instructions 701 non-transiently. For example, when the computer executable instruction 701 are executed by a computer, one or more steps of the touch method as described above may be performed.

For example, the non-transitory computer-readable storage medium 700 may include any combination of one or more computer program products, and the computer program products may include computer-readable storage media in various forms, for example, a volatile memory and/or a non-volatile memory. The volatile memory may include, for example, a random access memory (RAM) and/or a cache, or the like. By way of illustrative, but not limitative, descriptions, many forms of RAM are available, for example, a static random access memory (SRAM), a dynamic random access memory (DRAM), a synchronous dynamic random access memory (SDRAM), a double data rate synchronous dynamic random access memory (DDRS-DRAM), an enhanced synchronous dynamic random access memory (ESDRAM), a synchronous link dynamic random access memory (SLDRAM), and a Direct Rambus random access memory (DRRAM). The non-volatile memory may include, for example, a read only memory (ROM), a programmable read-only memory (PROM), a hard disk, an erasable programmable read-only memory (EPROM), a portable compact disk read-only memory (CD-ROM), a USB memory, a flash memory, or the like. It should be noted that the memories as described in the present disclosure are intended to include, but are not limited to, these and any other suitable types of memories.

For example, various applications and various data, etc. may also be stored in the non-transitory computer-readable storage medium 700.

For the present disclosure, the following statements should be noted:

(1) The accompanying drawings of the embodiments of the present disclosure involve only the structure(s) related to the embodiment(s) of the present disclosure, and other structure(s) can refer to common design(s).

(2) For the purpose of clarity, in the accompanying drawings for illustrating the embodiment(s) of the present disclosure, the thickness and the size of a layer or a structure may be enlarged. However, it should understood that, in the case in which a component or element such as a layer, film, region, substrate, or the like is referred to be "on" or "under" another component or element, it may be directly on or under the another component or element or a component or element is interposed therebetween.

(3) In case of no conflict, the embodiments of the present disclosure and the features in the embodiment can be combined with each other to obtain new embodiments.

What have been described above are only specific implementations of the present disclosure, the protection scope of the present disclosure is not limited thereto, and the protection scope of the present disclosure should be based on the protection scope of the claims.

What is claimed is:

1. A touch panel, comprising a touch chip and a touch electrode,
    wherein the touch chip is configured to generate a touch driving signal and apply the touch driving signal to the touch electrode,
    the touch electrode is configured to receive the touch driving signal, and generate a touch sensing signal based on the touch driving signal, and
    the touch driving signal comprises a plurality of sub-signals, the plurality of sub-signals comprise a first sub-signal and a second sub-signal, and the first sub-signal is different from the second sub-signal;
    wherein each sub-signal has a plurality of characteristics, for each sub-signal, the plurality of characteristics of the sub-signal comprise a rising edge time period of the sub-signal, a falling edge time period of the sub-signal, and a duration period of the sub-signal; and
    at least one characteristic of the first sub-signal is different from at least one characteristic of the second sub-signal;
    wherein the plurality of sub-signals comprise a plurality of sub-signal groups, and each sub-signal group comprises N sub-signals, wherein N is a positive integer greater than 1;
    the N sub-signals comprise the first sub-signal and the second sub-signal;
    wherein at least two rising edge time periods in N rising edge time periods respectively corresponding to the N sub-signals are different from each other;
    at least two falling edge time periods in N falling edge time periods respectively corresponding to the N sub-signals are different from each other,
    in terms of time, the N sub-signals are generated successively, the N rising edge time periods respectively corresponding to the N sub-signals increase or decrease sequentially according to a generation order of the N sub-signals, and the N falling edge time periods respectively corresponding to the N sub-signals increase or decrease sequentially according to the generation order of the N sub-signals.

2. The touch panel according to claim 1, wherein N duration periods respectively corresponding to the N sub-signals are all identical.

3. The touch panel according to claim 1, wherein at least two duration periods in N duration periods respectively corresponding to the N sub-signals are different from each other.

4. The touch panel according to claim 3, wherein the N duration periods respectively corresponding to the N sub-signals increase or decrease sequentially according to the generation order of the N sub-signals.

5. The touch panel according to claim 4, wherein a difference between duration periods of two sub-signals, generated adjacent in terms of time, among the N sub-signals is a fixed value.

6. The touch panel according to claim 1, wherein the N sub-signals further comprise a third sub-signal;
    the first sub-signal is a triangular wave signal, the second sub-signal is a sine wave signal, and the third sub-signal is a trapezoidal wave signal.

7. The touch panel according to claim 1, further comprising a guard electrode, wherein the touch chip is configured to apply the touch driving signal to the touch electrode in a touch phase, the touch chip is configured to generate and apply a guard signal to the guard electrode in the touch phase, and the guard signal is identical to the touch driving signal.

8. The touch panel according to claim 7, further comprising: a data line, a gate line, a pixel electrode, and a transistor, wherein a gate electrode of the transistor is electrically connected with the gate line, a first electrode of the transistor is electrically connected with the data line, and a second electrode of the transistor is electrically connected with the pixel electrode, and the data line and/or the gate line is multiplexed as the guard electrode.

9. The touch panel according to claim 1, further comprising: a touch signal line, wherein the touch electrode is connected to the touch chip through the touch signal line, the touch chip applies the touch driving signal to the touch electrode through the touch signal line, and the touch chip receives the touch sensing signal generated by the touch electrode through the touch signal line to implement a touch function.

10. A touch method, applied to a touch panel, wherein the touch panel comprises a touch chip and a touch electrode, the touch chip is configured to generate a touch driving signal and apply the touch driving signal to the touch electrode, the touch electrode is configured to receive the touch driving signal, and generate a touch sensing signal based on the touch driving signal, and the touch driving signal comprises a plurality of sub-signals, the plurality of sub-signals comprise a first sub-signal and a second sub-signal, and the first sub-signal is different from the second sub-signal, wherein each sub-signal has a plurality of characteristics, for each sub-signal, the plurality of characteristics of the sub-signal comprise a rising edge time period of the sub-signal, a falling edge time period of the sub-signal, and a duration period of the sub-signal; and at least one characteristic of the first sub-signal is different from at least one characteristic of the second sub-signal;

wherein the plurality of sub-signals comprise a plurality of sub-signal groups, and each sub-signal group comprises N sub-signals, wherein N is a positive integer greater than 1;

the N sub-signals comprise the first sub-signal and the second sub-signal;

wherein at least two rising edge time periods in N rising edge time periods respectively corresponding to the N sub-signals are different from each other, at least two falling edge time periods in N falling edge time periods respectively corresponding to the N sub-signals are different from each other, in terms of time, the N sub-signals are generated successively, the N rising edge time periods respectively corresponding to the N sub-signals increase or decrease sequentially according to a generation order of the N sub-signals, and the N falling edge time periods respectively corresponding to the N sub-signals increase or decrease sequentially according to the generation order of the N sub-signals, the touch method comprises:

in a touch phase:

generating the touch driving signal;

applying the touch driving signal to the touch electrode;

generating, by the touch electrode, the touch sensing signal; and sensing the touch sensing signal to implement a touch function.

11. The touch method according to claim 10, wherein the touch panel comprises a guard electrode, and the touch method further comprises: in the touch phase:

generating a guard signal, wherein the guard signal is identical to the touch driving signal; and applying the guard signal to the guard electrode.

12. An electronic apparatus, comprising a touch panel, wherein the touch panel comprises a touch chip and a touch electrode, the touch chip is configured to generate a touch driving signal and apply the touch driving signal to the touch electrode, the touch electrode is configured to receive the touch driving signal, and generate a touch sensing signal based on the touch driving signal, and the touch driving signal comprises a plurality of sub-signals, the plurality of sub-signals comprise a first sub-signal and a second sub-signal, and the first sub-signal is different from the second sub-signal;

wherein each sub-signal has a plurality of characteristics, for each sub-signal, the plurality of characteristics of the sub-signal comprise a rising edge time period of the sub-signal, a falling edge time period of the sub-signal, and a duration period of the sub-signal; and at least one characteristic of the first sub-signal is different from at least one characteristic of the second sub-signal;

wherein the plurality of sub-signals comprise a plurality of sub-signal groups, and each sub-signal group comprises N sub-signals, wherein N is a positive integer greater than 1;

the N sub-signals comprise the first sub-signal and the second sub-signal;

wherein at least two rising edge time periods in N rising edge time periods respectively corresponding to the N sub-signals are different from each other;

at least two falling edge time periods in N falling edge time periods respectively corresponding to the N sub-signals are different from each other, in terms of time, the N sub-signals are generated successively, the N rising edge time periods respectively corresponding to the N sub-signals increase or decrease sequentially according to a generation order of the N sub-signals, and the N falling edge time periods respectively corresponding to the N sub-signals increase or decrease sequentially according to the generation order of the N sub-signals.

13. A non-transitory computer-readable storage medium, configured to store computer executable instructions, wherein when the computer executable instructions are executed by a computer, the touch method according to claim 10 is implemented.

* * * * *